United States Patent [19]

Klumpjan

[11] Patent Number: 5,215,355
[45] Date of Patent: Jun. 1, 1993

[54] HANDS-FREE DUMPING WAGON

[76] Inventor: Joe Klumpjan, 1334 Sunset Dr., Rte. 3, Campbellsport, Wis. 53010

[21] Appl. No.: 955,127

[22] Filed: Oct. 1, 1992

[51] Int. Cl.⁵ .................... B60P 1/24; B62C 1/04
[52] U.S. Cl. ........................ 298/6; 280/1.5; 298/5
[58] Field of Search ............... 280/1.5, 204; 298/5, 298/6, 23 D

[56] References Cited

U.S. PATENT DOCUMENTS

| | | |
|---|---|---|
| 256,362 | 4/1882 | Nichols . |
| 295,072 | 3/1884 | Stewart . |
| 296,938 | 4/1884 | Dees . |
| 315,968 | 4/1885 | Stewart . |
| 328,219 | 10/1885 | Hill . |
| 789,212 | 5/1905 | Duke . |
| 835,999 | 11/1906 | Young . |
| 938,198 | 10/1909 | Young et al. . |
| 980,556 | 1/1911 | Pape . |
| 1,390,122 | 9/1921 | Gilbert et al. ............... 298/23 D X |
| 2,613,953 | 10/1952 | Giovannoni . |
| 3,328,043 | 6/1967 | Johnson . |
| 3,578,806 | 5/1971 | Tonelli . |
| 3,926,448 | 12/1975 | Reichard . |
| 4,632,461 | 12/1986 | Randolph . |
| 5,106,108 | 4/1992 | Howell .................... 280/1.5 |

Primary Examiner—Michael S. Huppert
Assistant Examiner—Janice Krizek
Attorney, Agent, or Firm—Andrus, Sceales, Starke & Sawall

[57] ABSTRACT

A hands-free dump wagon includes a harness with a universal hitch attached directly to the tongue of the wagon, permitting the user complete freedom of movement while the wagon is attached. A handle is positioned near the universal hitch and includes an actuator mechanism for locking and unlocking the wagon bin relative to the tongue to permit both a tilting and dumping action. A linkage assembly is connected to the tongue and pivotably secured to an end gate, automatically opening the gate for dumping the contents of the wagon when the wagon bin is moved from the locked position to the unlocked, tilted position.

15 Claims, 2 Drawing Sheets

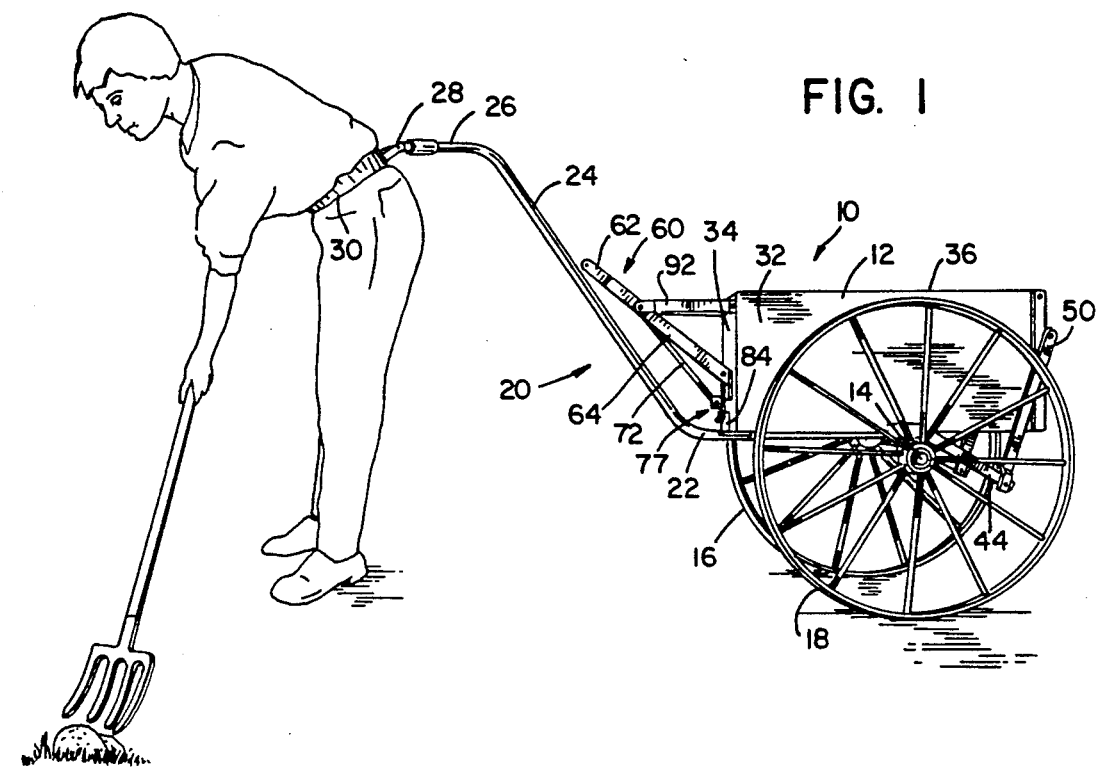
FIG. 1
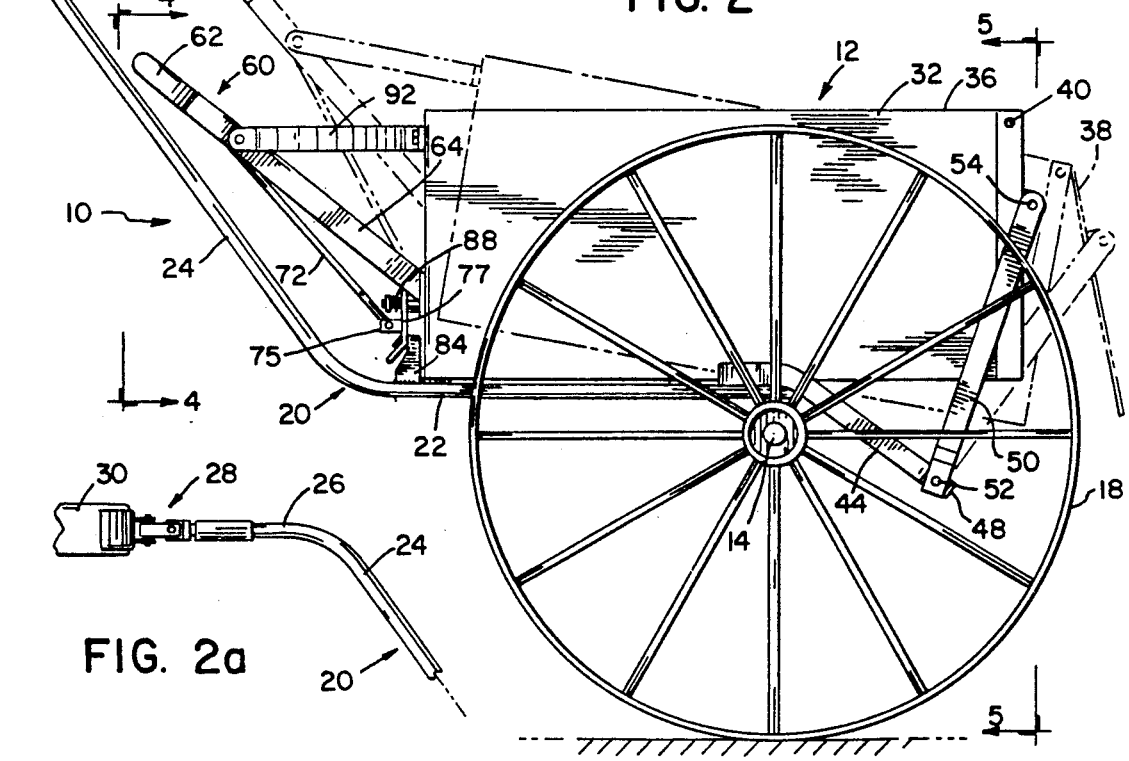
FIG. 2
FIG. 2a

HANDS-FREE DUMPING WAGON

BACKGROUND OF THE INVENTION

1. Field of the Invention

This invention is related to dump carts or dump wagons and is specifically directed to a dumping wagon adapted for hands-free use.

2. Description of the Prior Art

In regions having a rolling topography created by glacial movements, fields which have been converted to agricultural use often contain a great number of small stones just below the surface. Typically, a number of these stones are pushed upwardly toward the surface and partially surface with each spring thaw. This is particularly true in certain regions of New England, and the upper Midwest such as Wisconsin and Minnesota. Over the years these stones have continuously interfered with tilling operations, generating a hazard for plow shares and other tilling tools, often damaging or breaking the tools during preparation of the soil for planting.

It has become necessary to remove as many of the partially surfaced stones as possible prior to each growing season. Even with the rapid development of automation and farming equipment, "stone-picking" remains a largely manual operation. This is because it is desirable to only remove those stones closest to the surface prior to each growing season. When automated equipment is used, the process of removing stones becomes an endless endeavor. Every time a layer of soil is removed to extract the stones closest to the surface, another layer of soil with embedded stones is exposed. Therefore, it is desirable to remove only the uppermost stones in order to clear a section of topsoil for plowing and planting without distributing the stones embedded in the next level. This is an annual activity.

"Stone-picking" is a tiring and time-consuming chore. Typically a stone fork is used to loosen the stones and lift them out of the ground and into a receptacle for disposal. A stone fork is similar to a pitch fork, having a lower end with wide prongs which are adapted to be placed under the stone for lifting it by using a lever action. The loosened stones are then either manually lifted or lifted by use of a fork into a wagon or wheel barrow or the like for transport to a deposit location. The constant bending, lifting, and moving of the wheel barrow and wagon, along with the lifting and picking of the stones from the soil is a back-breaking chore. After the stones are placed in the wagon or cart, they are then transported to the deposit location, adding further to the amount of manual labor required to lift the stones.

Over the years, a number of dumping carts or dumping wagons have been developed which facilitate in the removal of heavy loads such as stones from a cart or wagon after it has been transported to a dumping location. Examples are shown in U.S. Pat. No. 256,362 issued to U. R. Nichols on Apr. 11, 1882; U.S. Pat. No. 295,072 issued to T. S. Stewart on Mar. 11, 1884; U.S. Pat. No. 296,938 issued to L. C. Dees on Apr. 15, 1884; U.S. Pat. No. 315,968 issued to T. S. Stewart on Apr. 14, 1885; U.S. Pat. No. 328,219 issued to T. Hill on Oct. 13, 1885; U.S. Pat. No. 789,212 issued to D. P. Duke on May 9, 1905; U.S. Pat. No. 835,999 issued to L. H. Young on Nov. 13, 1906; U.S. Pat. No. 938,198 issued to L. H. & A. Young on Oct. 26, 1909; U.S. Pat. No. 980,556 issued to C. O. Pape on Jan. 3, 1911.

Hands-free carts are shown in U.S. Pat. No. 2,613,953 issued to C. E. Giovannoni on Oct. 14, 1952 and U.S. Pat. No. 3,926,448 issued to K. Reichard on Dec. 16, 1975.

SUMMARY OF THE INVENTION

The subject invention is specifically directed to a hands-free dumping cart or dumping wagon particularly well suited for "stone-picking" and similar types of chores, wherein it is required to have freedom of movement while using the cart in order to pick up relatively heavy objects and place them in the cart. By using the hands-free cart of the subject invention, the amount of labor required to complete the chore and maneuver the cart is greatly reduced, reducing the fatigue and increasing the efficiency of the operation.

It is an important feature of the subject invention that the tilting means permits the user to dump the wagon contents with use of one hand, without first removing the wagon harness from his waist. A unique linkage between the axle and the end gate of the wagon bin creates a single action, single control lever mechanism permitting dumping of the wagon.

The wagon of the preferred embodiment is adapted to be secured around the waist of the user and manually pulled without the use of hands. The wagon includes a universal hitch for permitting full freedom of movement of the user while attached to the wagon, greatly facilitating filling, maneuvering and dumping activities associated with the wagon. In the preferred embodiment, a wagon bin is supported above a wheel and axle combination, and a tongue extends outwardly from the axle and is in a fixed relationship therewith. A universal joint is provided on the outer end of the tongue. A harness or other means is attached to the universal joint for securing the wagon to the waist area of the user. The dump mechanism attached to the wagon bin extends outwardly in non-interfering relationship with the tongue to a position adapted for permitting the user to grasp the tilting means and dump the wagon without first removing the harness from his waist.

In the preferred embodiment, a latch keeper is mounted directly on the tongue and the latch strike is selectively engageable by the latch keeper. The latch strike includes an elongated actuator operable by the user while the wagon is attached to his or her waist. The hinged gate of the wagon is selectively movable between open and closed positions by including a fixed support extending outwardly and rearwardly from the axle and an elongated actuator arm having opposite ends pivotably secured to the outer end of the support and the gate, whereby tilting of the wagon then relative to the axle will cause the gate to swing outwardly and open once the latch is released and the handle on the front of the bin is used to tilt the wagon upwardly and rearwardly, to dump the contents.

It is, therefore, an object and feature of the subject invention to provide a hands-free dump cart or wagon, permitting a user to maneuver the cart or wagon while undertaking lifting, filling and dumping tasks without detaching the wagon from the user, while leaving the hands free to accomplish various related operations.

It is an other object and feature of the subject invention to provide for a single lever actuator locking the wagon bin in place and adapted for unlocking the wagon bin and actuating the tilt and dump operation in a single movement.

It is another object and feature of the subject invention to provide a dump wagon particularly well suited for "stone-picking" chores, wherein the user's hands are always free to pick, lift and load the stones into the wagon while maneuvering the wagon around a stone laden field.

Other objects and features of the invention will be readily apparent from the accompanying drawings and detailed description of the preferred embodiment.

BRIEF DESCRIPTION OF THE DRAWINGS

FIG. 1 is a perspective view of a hands-free dump wagon in accordance with the subject invention.

FIG. 2 is a side plan view of the wagon of FIG. 1, with the outer end of the tongue truncated.

FIG. 2a is a side plan view of the truncated portion of the tongue of the wagon shown in FIG. 2.

DETAILED DESCRIPTION OF THE PREFERRED EMBODIMENT

Figure 3:
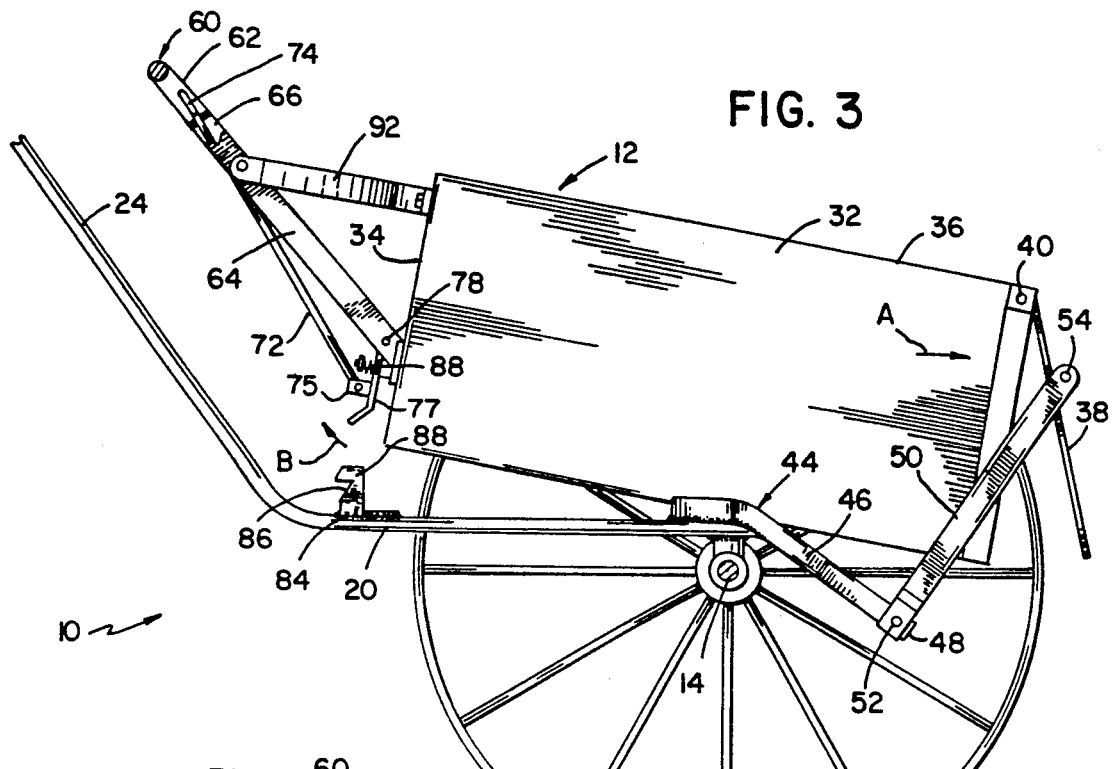
FIG. 3 is a view similar to FIG. 2, showing the wagon in the tilt and dump position.

The dump wagon or dump cart of the subject invention is shown in the drawings and is designated generally by the reference numeral 10. As is specifically shown in FIG. 1, the wagon includes a bin 12 mounted above an axle 14. A pair of wheels 16 and 18 are mounted for rotation on the axle 14, on either side of the bin 12. A tongue 20 is secured in a fixed position relative to the axle and includes a substantially horizontal, outwardly extending reach 22 merging into a substantially upwardly extending reach 24 having an outer end 26. The outer end 26 includes a universal joint 28 (FIG. 2a) adapted for securing a device 30 designed for attaching the wagon 10 to a user. In the preferred embodiment, the device 30 comprises a belttype harness adapted to be placed around the waist of the user. As can be seen in FIG. 1, the wagon 10 is particularly well suited for stone-picking chores, wherein the user may bend over and remove objects from the soil and place them in the bin 12 of the wagon while the wagon is attached to the user's waist.

As can be seen in FIGS. 2 and 3, the wagon of the subject invention is adapted to be tilted and dumped. In the preferred embodiment, the bin 12 comprises a closed bottom and upstanding side walls 32 and an upstanding front wall 34. The top edge 36 of the side walls and front wall define the open top of the bin 12. The rear of the bin is open and includes an end gate 38. The end gate 38 is hingedly secured to the side walls 32, as shown at 40 and 42, adjacent the upper end 36 of the side walls 32. As can be seen in FIGS. 2 and 3, the end gate closes the rear of the bin when the bin is in the horizontal position of FIG. 2, and swings outwardly from the bottom of the bin to the open position of FIG. 3 as the bin is tilted to dump the contents.

Figure 5:
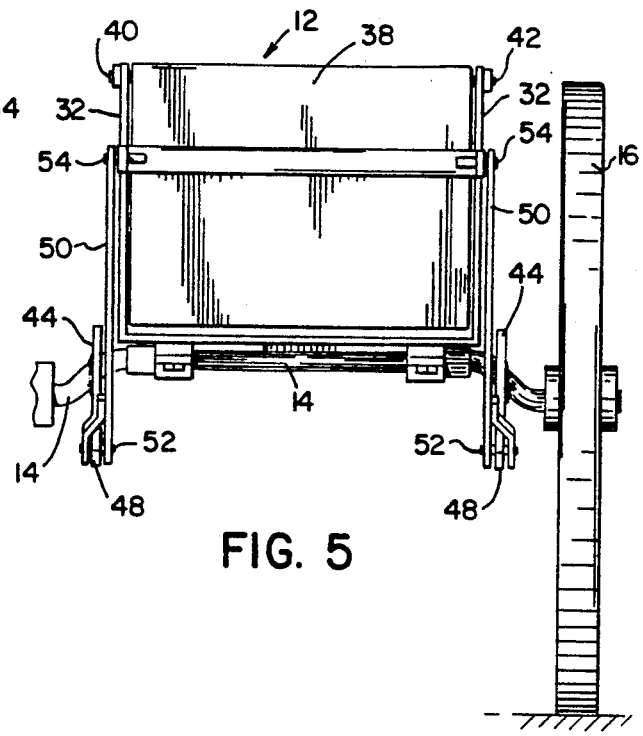
FIG. 5 is a partial rear plan view showing the end gate of the wagon.

In the preferred embodiment of the invention, a support bar or rod 44 is secured in a fixed relationship relative to the tongue 20, as is best shown in FIG. 3. The support rod 44 may be welded to the tongue structure or otherwise suitably secured. The support bar 44 includes an outwardly and downwardly extending reach 46 terminating at a point 48 behind and below the axle 14. An actuator arm 50 has opposite ends pivotably secured to the outer end 48 of the support rod 44 and the end gate 38, as shown at 52 and 54, respectively. As is particularly shown in FIG. 5, the support rod and actuator arm assembly may be duplicated on the other side of the bin 12. As the bin 12 is tilted from its horizontal position (FIG. 2) to the tilt and dump position of FIG. 3, the actuator arm 50 pivots outwardly in the direction of arrow A, causing the end gate 38 to tilt outwardly relative to the rear of the bin, permitting the contents of the bin to be dumped. As shown in FIG. 2, when the bin is positioned in the horizontal position, the actuator arm forces the end gate against the side walls of the bin 12, closing the bin.

In the preferred embodiment, a single actuator handle and latch mechanism 60 is used to both tilt the wagon and actuate the dumping mechanism. As is particularly shown in FIGS. 2, 3 and 4, the actuator handle 60 includes an outer stationary handle 62 having a pair of elongated support members 64 and 66 mounted directly to the front wall 34 of the wagon, as at 68 and 70. An actuator lever and handle 72 is disposed inwardly of the support members 64 and 66 and includes an inner handle 74. In the preferred embodiment, the actuator handle mechanism 60 is designed so that the user may place the palm of his hand over the round bar 76 of the outer handle 72 and simultaneously place the fingers of the hand inside the handle 74, whereby the handle 74 may be squeezed toward the bar 76 to release the latch.

The lower end of the latch actuator arm 72 is pivotably attached to a bracket 75 which is secured to an angled latch strike 77. The latch strike 77 is pivotably mounted to the support members 64 and 66, as shown at 78. When the actuator handle 74 is squeezed toward the bar 76, the latch keeper 77 pivots outwardly in the direction of arrow B.

Figure 4:
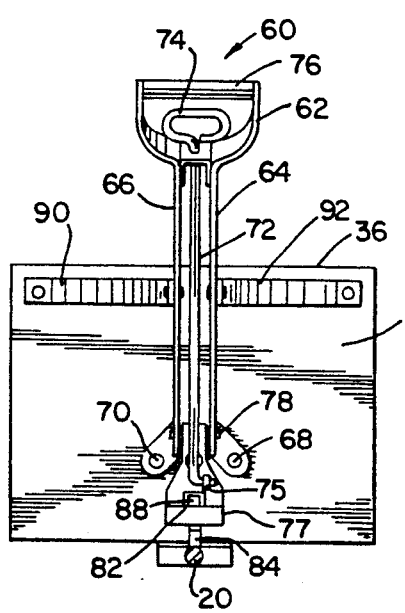
FIG. 4 is a view looking generally in the direction of the arrow 4—4 of FIG. 2.

As is better seen in FIG. 4, the latch strike 77 includes a through aperture 82. The latch keeper 84 is mounted directly on the tongue 20 of the wagon by welding or other suitable means and includes a notch 86 with a keeper 88 adapted to be received in the aperture 82 of the strike 77. In the preferred embodiment of the invention, a spring biasing means 88 is attached to the strike 77 between the actuator pivot bracket 75 and the strike pivot 78 for normally biasing the strike 77 toward the bin front wall 34. When the wagon is placed in the horizontal position, the spring 88 acts to urge the strike 77 into positive engagement with the keeper 84 for locking the bin in the horizontal position and locking the end gate 38 in the closed position. When it is desired to tilt and dump the wagon, the inner handle 74 is squeezed toward the bar 76, releasing the strike 77 from the notch 86, permitting the wagon to be tilted as shown in FIG. 3, for dumping the contents of the bin 12 through the open end gate 38.

In the preferred embodiment, additional support brackets 90 and 92 (FIG. 4) may be used to support the handle and release mechanism assembly 60. As is clearly shown in FIGS. 1 and 2, the handle mechanism 60 is in non-interfering relationship with the tongue 20 when the bin 12 is in both the horizontal position and the dump position.

While certain features and embodiments of the invention have been described in detail herein, it will be readily understood that the invention includes all enhancements and modifications within the scope and spirit of the following claims.

What is claimed is:

1. A wagon adapted for being secured to the waist of a user and pulled without the use of hands, the wagon having a universal hitch permitting full freedom of movement of the user while attached to the wagon for permitting filling, maneuvering and dumping activities associated with the wagon, the wagon comprising:
   a. a wheel and axle;
   b. a wagon bin supported by the wheel and axle;
   c. a tongue having one end secured in a fixed relationship relative to the axle and an opposite outer end extending radially outwardly from the axle;
   d. a universal joint on the outer end of the tongue;
   e. securing means attached to the universal joint for securing the tongue to a waist area of the user; and
   f. tilting means attached to the wagon bin and extending outwardly in non-interfering relationship with the tongue to a position permitting the user to grasp the tilting means and dump the wagon without first removing the securing means from the waist.

2. The wagon of claim 1, wherein there is further included a pair of wheels on opposite ends of an elongated axle and the wagon bin is mounted between the wheels above the axle.

3. The wagon of claim 2, wherein the tongue includes a substantially horizontal reach extending radially outwardly from the axle under the wagon bin and an upwardly extending reach terminating at approximately waist height of the user.

4. The wagon of claim 3, wherein the bin includes a closed bottom, an upstanding front wall, upstanding side walls and an open top and back, and a hinged gate secured to the side walls and spanning the open back, the gate selectively movable between open and closed positions.

5. The wagon of claim 4, wherein the front and side walls have an upper edge defining the top of the bin and wherein the gate is hinged to the side walls adjacent the top of the bin such that the gate swings between the open and closed positions.

6. The wagon of claim 5, further including a gate latch secured to the gate and including:
   a. a support secured in a fixed relationship relative to the axle and having an outer end positioned rearwardly of and below the axle; and
   b. an elongated actuator arm having opposite outer ends pivotally secured to the outer end of the support and the gate, whereby tilting of the wagon bin relative to the axle will cause the gate to swing outwardly and open the back of the bin.

7. The wagon of claim 2, wherein the tilting means further comprises:
   a. an elongated handle having one end attached to the bin and an opposite free end positioned adjacent the universal joint; and
   b. a latch for releasably securing the bin relative to the tongue, the latch movable between a locked position for latching the bin in a fixed position relative to the tongue and an unlatched position permitting the bin to tilt relative to the tongue.

8. The wagon of claim 7, wherein the latch further includes:
   a. a latch keeper mounted on the tongue;
   b. a latch strike selectively engageable with the latch keeper;
   c. an elongated latch actuator for controlling the latch strike; and
   d. means for normally biasing the latch strike into engagement with the latch keeper.

9. The wagon of claim 8, wherein the latch actuator is operable from the free end of the elongated handle.

10. The wagon of claim 2, wherein the universal joint is secured to an upwardly extending reach of the tongue at the termination thereof.

11. A wagon adapted for being secured to the waist of a user and pulled without the use of hands, the wagon having a universal hitch permitting full freedom of movement of the user while attached to the wagon for permitting filling, maneuvering and dumping activities associated with the wagon, the wagon comprising:
   a. a pair of wheels on opposite ends of an elongated axle;
   b. a wagon bin mounted between the wheels and supported by and above the axle;
   c. a tongue having one end secured in a fixed relationship relative to the axle and an opposite outer end extending radially outwardly from the axle, the tongue including a substantially horizontal reach extending radially outwardly from the axle under the wagon bin and an upwardly extending reach terminating at approximately waist height of the user;
   d. a universal joint on the outer end of the tongue;
   e. securing means attached to the universal joint for securing the tongue to a waist area of the user; and
   f. tilting means attached to the wagon bin and extending outwardly in non-interfering relationship with the tongue to a position permitting the user to grasp the tilting means and dump the wagon without first removing the securing means from the waist.

12. The wagon of claim 11, wherein the bin includes a closed bottom, an upstanding front wall, upstanding side walls and an open top and back, and a hinged gate secured to the side walls and spanning the open back, the gate selectively movable between open and closed positions, the front and side walls having an upper edge defining the top of the bin and wherein the gate is hinged to the side walls adjacent the top of the bin such that the gate swings between the open and closed positions.

13. The wagon of claim 11, further including a gate latch secured to the gate and including:
   a. a support secured in a fixed relationship relative to the axle and having an outer end positioned rearwardly of and below the axle; and
   b. an elongated actuator arm having opposite outer ends pivotally secured to the outer end of the support and the gate, whereby tilting of the wagon bin relative to the axle will cause the gate to swing outwardly and open the back of the bin.

14. The wagon of claim 11, wherein the tilting means further comprises:
   a. an elongated handle having one end attached to the bin and an opposite free end; and
   b. a latch keeper mounted on the tongue;
   c. a latch strike movable between a latched position and an unlatched position and adapted for engaging the latch keeper when in the latched position for maintaining the bin in a fixed position relative to the tongue;
   d. an elongated latch actuator for controlling the latch strike; and
   e. means for normally biasing the latch strike into engagement with the latch keeper.

15. The wagon of claim 14, wherein the latch actuator is operable from the free end of the elongated handle.

* * * * *